United States Patent
Archer et al.

(10) Patent No.: US 10,382,913 B2
(45) Date of Patent: *Aug. 13, 2019

(54) DISTRACTED DRIVING PREVENTION

(71) Applicant: INTERNATIONAL BUSINESS MACHINES CORPORATION, Armonk, NY (US)

(72) Inventors: Adam G. Archer, Toronto (CA); Herman S. Badwal, Markham (CA); Robin Y. Bobbitt, Raleigh, NC (US); Christopher M. Lee-Shanok, Scarborough (CA); Robert Retchless, North York (CA); Christopher N. Taylor, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,174

(22) Filed: Jan. 2, 2019

(65) Prior Publication Data

US 2019/0141490 A1     May 9, 2019

Related U.S. Application Data

(63) Continuation of application No. 15/860,826, filed on Jan. 3, 2018, now Pat. No. 10,219,125, which is a
(Continued)

(51) Int. Cl.
*H04W 4/12* (2009.01)
*H04W 4/30* (2018.01)
(Continued)

(52) U.S. Cl.
CPC ............... *H04W 4/16* (2013.01); *H04W 4/12* (2013.01); *H04W 4/30* (2018.02); *H04W 4/40* (2018.02)

(58) Field of Classification Search
None
See application file for complete search history.

(56) References Cited

U.S. PATENT DOCUMENTS 8,594,705 B2   11/2013   Osann, Jr.
8,884,750 B2   11/2014   Bacal
(Continued)

FOREIGN PATENT DOCUMENTS

WO      2014062570 A2    4/2014

OTHER PUBLICATIONS

Consumer Reports; Apps that shut out distractions; Jan. 2014; Retrieved from the Internet URL: http://www.consumerreports.org/cro/magazine/2014/01/apps-that-shut-out-distractions/index.htm; 2 pages.
(Continued)

*Primary Examiner* — Vladimir Magloire
*Assistant Examiner* — Donald H B Braswell
(74) *Attorney, Agent, or Firm* — Schmeiser, Olsen & Watts; Mark C. Vallone

(57) ABSTRACT

A method and system enabling an initiator based process for preventing distracted driving is provided. The method includes continuously retrieving by a mobile device from a plurality of sensing devices, sensor data. The sensor data is analyzed and based on the analysis it is determined that a user of the mobile device is currently operating a vehicle. A message is generated indicating that the user is currently operating the vehicle. The message is transmitted to and stored by a server.

20 Claims, 4 Drawing Sheets

Related U.S. Application Data continuation of application No. 14/926,245, filed on Oct. 29, 2015, now Pat. No. 9,949,098.

(51) Int. Cl.
*H04W 4/40* (2018.01)
*H04W 4/16* (2009.01)

(56) References Cited

U.S. PATENT DOCUMENTS

| | | | |
|---|---|---|---|
| 9,949,098 B2 | 4/2018 | Archer | |
| 2011/0086647 A1* | 4/2011 | Riddle | G06Q 10/10 455/466 |
| 2012/0214472 A1* | 8/2012 | Tadayon | H04B 5/0062 455/418 |
| 2012/0315880 A1 | 12/2012 | Peitrow | |
| 2013/0150004 A1 | 6/2013 | Rosen | |
| 2013/0293384 A1 | 11/2013 | Reyes | |
| 2014/0024347 A1 | 1/2014 | Carter | |
| 2014/0106725 A1* | 4/2014 | Sauerwein, Jr. | H04W 4/16 455/418 |
| 2014/0274023 A1 | 9/2014 | Rajeevalochana | |
| 2016/0050315 A1* | 2/2016 | Malhotra | H04M 3/436 455/414.1 |
| 2016/0183069 A1* | 6/2016 | Wilson | H04W 4/14 455/466 |
| 2017/0127255 A1 | 5/2017 | Archer | |
| 2018/0124580 A1 | 5/2018 | Archer | |

OTHER PUBLICATIONS

Copeland, Larry; Technology tackles teen drivers' phone distractions; USA Today; Jan. 17, 2012; 5 pages.

Fox, Steve; 5 apps to prevent distracted driving; San Jose Mercury News; Nov. 14, 2013; 4 pages.

Freeman, Kate; 5 Apps to Prevent Your Teem From Texting While Driving; http://mashable.com/2012/12/08/apps-texting-while-driving/; Dec. 8, 2012; 5 pages.

Friedman, Mark J.; List of IBM Patents or Patent Applications Treated as Related; Jan. 2, 2019; 1 page.

Gibbs, Samuel; Apple's iPhone "lock-out" patent could end texting while driving; The Guardian; Apr. 24, 2014; 2 pages.

Lindqvist, et al.; Undistracted Driving: A Mobile Phone that Doesn't Distract; HotMobile 2011; Mar. 1-2, 2011; pp. 70-75.

Lyden, Sean; 6 Mobile Applications to Prevent Distracted Driving Accidents; Automotive Fleet; Aug. 2011; Retrieved from the Internet URL: http://www.automotive-fleet.com/article/story/2011/08/6-mobile-applications-to-prevent-distracted-driving-accidents.aspx; 18 pages.

Schmitz, Matt; Distracted driving apps for when willpower fails; Retrieved from the Internet, URL: http://www.usatoday.com/story/money/cars/2014/04/30/distracted-driving-apps/8528939/; retrieved on Jun. 8, 2015; 2 pages.

Verizon Wireless; Apps to Block Texting While Driving; Retrieved from the Internet, URL: http://www.verizonwireless.com/mobile-living/apps/block-texting-while-driving/; retrieved on Jun. 8, 2015; 18 pages.

* cited by examiner

DISTRACTED DRIVING PREVENTION

CROSS REFERENCE TO RELATED APPLICATIONS

This application is a continuation application claiming priority to Ser. No. 15/860,826 filed Jan. 3, 2018 which is a continuation application claiming priority to Ser. No. 14/926,245 filed Oct. 29, 2015 now U.S. Pat. No. 9,949,098 issued Apr. 17, 2018, the contents of which are hereby incorporated by reference.

FIELD

The present invention relates generally to a method for preventing distracted driving and in particular to a method and associated system for enabling a communication initiator based distracted driving method.

BACKGROUND

Dangers associated with texting (or communicating) during a driving process are well known. A large number of solutions currently exist with respect to an attempt to prevent a driver from engaging in the aforementioned behavior. Prevention devices may be installed in a vehicle as well as applications installed on a phone such that features of the phone are disabled during vehicle motion. Additional applications may allow parents to control a child's phone from a remote location as well as access reports with respect to usage of the child's phone during driving. Similarly, mobile alert devices may be integrated within a vehicle to detect that a driver is driving and to maintain the status of the driver in order to intercept calls and texts from the initiator to determine what an initiator reacts to the driver's status. Further typical solutions completely lock down recipient devices from receiving any phone calls (e.g., directing a caller to voicemail) and text messages (e.g., disabling text notifications), rather than allowing an initiator to decide/schedule a text to be transmitted at a later time. Additionally, typical vehicle motion detection system s rely determining that a cell phone is connected to an automobile rather than using sensors on a phone or vehicle to detect motion.

However, the aforementioned solutions may require active participation by the driver to enable the solution thereby requiring that a distracted driver (or parent) recognize an inability to police themselves and willingly subject themselves to the inconvenience and frustration of being blocked from engaging in the dangerous behavior. Additionally, the aforementioned solutions may require multiple devices for determining a driver status. As a result, the current solutions do not comprise an effective means for combatting distracted driving within the driving population.

Accordingly, there exists a need in the art to present an initiator with a communication recipient status to select enabling or disabling a communication initiation process.

SUMMARY

A first aspect of the invention provides a distracted driving prevention method comprising: continuously retrieving, by a computer processor of a mobile device from a plurality of sensing devices, sensor data; analyzing, by the computer processor, the sensor data; determining, by the computer processor based on results of the analyzing, that a user of the mobile device is currently operating a vehicle above a predetermined speed; generating, by the computer processor in response to the determining, a message indicating that the user is currently operating the vehicle; transmitting, by the computer processor to a server, the message; and storing within the server, by the computer processor, the message.

A second aspect of the invention provides a initiator based distracted driving prevention method comprising: receiving, by a computer processor of a mobile device belonging to an initiating user, a selection of a recipient; transmitting to a server, by the computer processor in response to the selection, a request associated with initiating communications, via the mobile device, with the recipient; receiving, by the computer processor from the server in response to the request, a message indicating that the recipient is currently operating a vehicle above a predetermined speed, the message generated by an additional mobile device belonging to the recipient based on analysis of sensor data retrieved from a plurality of sensing devices; presenting, by the computer processor to the initiating user via the mobile device, the message; receiving, by the computer processor from the initiating user in response to the message, a command; and executing, by the computer processor in response to the command, a communication process associated with the recipient.

A third aspect of the invention provides a computer program product, comprising a computer readable hardware storage device storing a computer readable program code, the computer readable program code comprising an algorithm that when executed by a computer processor of a mobile device implements a distracted driving prevention method, the method comprising: continuously retrieving, by the computer from a plurality of sensing devices, sensor data; analyzing, by the computer processor, the sensor data; determining, by the computer processor based on results of the analyzing, that a user of the mobile device is currently operating a vehicle above a predetermined speed; generating, by the computer processor in response to the determining, a message indicating that the user is currently operating the vehicle; transmitting, by the computer processor to a server, the message; and storing within the server, by the computer processor, the message.

A fourth aspect of the invention provides a computer program product, comprising a computer readable hardware storage device storing a computer readable program code, the computer readable program code comprising an algorithm that when executed by a computer processor of a mobile device belonging to an initiating user implements initiator based distracted driving prevention method, the method comprising: receiving, by the computer processor, a selection of a recipient; transmitting to a server, by the computer processor in response to the selection, a request associated with initiating communications, via the mobile device, with the recipient; receiving, by the computer processor from the server in response to the request, a message indicating that the recipient is currently operating a vehicle above a predetermined speed, the message generated by an additional mobile device belonging to the recipient based on analysis of sensor data retrieved from a plurality of sensing devices; presenting, by the computer processor to the initiating user via the mobile device, the message; receiving, by the computer processor from the initiating user in response to the message, a command; and executing, by the computer processor in response to the command, a communication process associated with the recipient.

A fifth aspect of the invention provides a mobile device comprising a computer processor coupled to a computer-readable memory unit, the memory unit comprising instructions that when executed by the computer processor implements a distracted driving prevention method comprising: continuously retrieving, by the computer from a plurality of sensing devices, sensor data; analyzing, by the computer processor, the sensor data; determining, by the computer processor based on results of the analyzing, that a user of the mobile device is currently operating a vehicle above a predetermined speed; generating, by the computer processor in response to the determining, a message indicating that the user is currently operating the vehicle; transmitting, by the computer processor to a server, the message; and storing within the server, by the computer processor, the message.

The present invention advantageously provides a simple method and associated system capable of preventing dangers associated with texting (or communicating) during a driving process.

DETAILED DESCRIPTION

Figure 1:
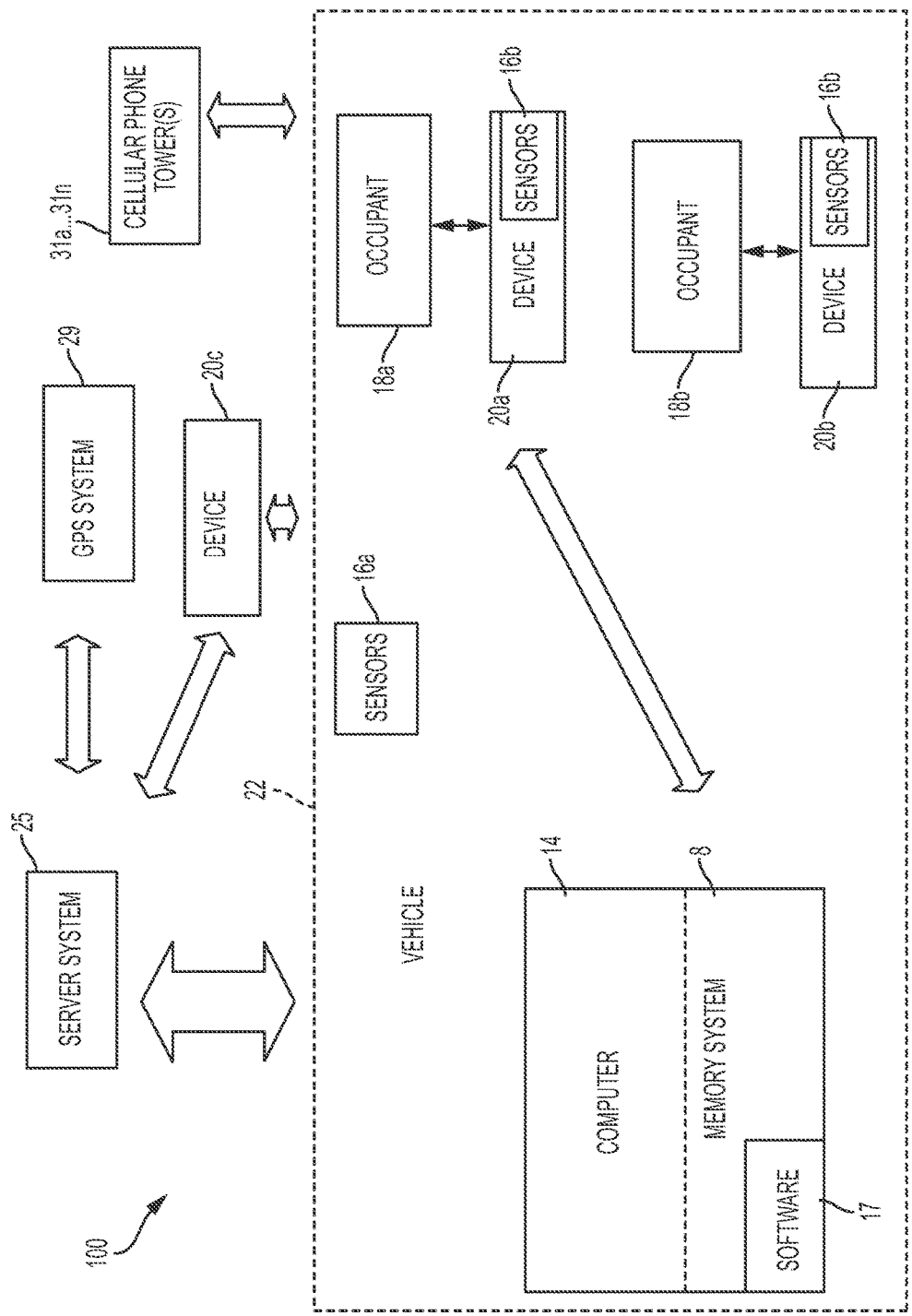
FIG. 1 illustrates a system 100 for enabling a communication initiator based distracted driving prevention method, in accordance with embodiments of the present invention.

FIG. 1 illustrates a system 100 for enabling an initiator based distracted driving prevention method, in accordance with embodiments of the present invention. System 100 is enabled to determine vehicle occupants 18a . . . 18b (e.g., a position) with respect to a vehicle 22 and disable (i.e., by an initiating user operating a mobile device 20c and selecting no communications to a recipient) selected functions (e.g., texting functions, phone call functions, Internet based functions, etc.) of associated mobile devices 20a . . . 20b based on a determined driver with respect to vehicle occupants 18a . . . 18b. Therefore, system 100 enables a communication initiator to participate in a decision as to whether a recipient engages in distracted driving thereby leveraging an initiator's desire to not distract a recipient known to be currently driving.

Typical distracted driver systems may include communication prevention devices and/or phone applications installed in a vehicle and/or a phone in order to disable communication features during vehicle motion. Further alert devices may be integrated within a vehicle to detect that a driver is driving and to maintain the status of the driver in order to intercept calls and texts from the initiator to determine what an initiator reacts to the driver's status. In contrast, system 100 does not require an additional intermediate device to be present for determination of a driver status. Additionally, system 100 does not utilize a server to intercept communication requests. In contrast, system 100 allows a user to enable a text window text window to determine that a communication recipient is typing. Likewise, system 100 allows an initiator to determine that a recipient is driving based on a determination that the recipient is moving at a speed above an appropriate threshold.

Therefore, rather than intercepting a communication from an initiator and responding back with options, system 100 enables an initiator based method for usage of sensors to determine vehicle motion (e.g., above a predetermined speed) presents the initiator with a recipient status (e.g., the recipient is currently receiving communications) necessary to select to not to initiate a communication at all. System 100 enables an initiator based distracted driving prevention method as follows:

In response to signaling an intent to initiate a communication (e.g., a text message, a phone call, etc.) via a wireless network to a specified recipient (e.g., occupant 18a), an initiator of the communication (e.g., using device 20c) receives an indication from a communication service indicating a presence of a mobile device of the specified recipient on the wireless network. Additionally, system 100 is enabled to detect whether the device of the specified recipient is currently in motion (e.g., above a predetermined speed) and determine that the device belonging to recipient is currently enabled to receive communications. If the specified recipient is determined to be in automobile 22 in motion (i.e., above a predetermined speed) and the specified recipient is currently receiving communication, the initiator may enable a command for postponing the outgoing communication until a later time. The postponing process may include:

1. Generating a reminder for the initiator to transmit the communication when the recipient is no longer in motion above the predetermined speed for a predefined duration.
2. Queuing the communication from the initiator to be transmitted (automatically) by the communication service when the recipient is no longer in motion above the predetermined speed.

System 100 of FIG. 1 includes a server system 25, a global positioning satellite (GPS) (or any type of movement detection system) system 29, cellular phone towers 31a . . . 31n, and an initiator mobile device(s) 20c communicatively connected (e.g., via a network) to a vehicle 22 (and/or directly to devices 20a and/or 20b) and/or directly to server system 25. The vehicle 22 includes an (optional) onboard computer 14, occupants 18a . . . 18b, sensors 16a, and associated mobile devices 20a . . . 20b (e.g., distraction devices). Onboard computer 14 may be comprised by mobile devices 20a and/or 20b and be communicably connected to server system 25, mobile device 20c, cellular phone towers 31a . . . 31n, and/or GPS system 29. Alternatively onboard computer 14 may comprise an external computer communicably connected to devices 20a . . . 20b, server system 25, mobile device 20c, cellular phone towers 31a . . . 31n, and/or GPS system 29. Onboard computer 14 may include any type of computing system(s) including, inter alia, an automobile integrated computer, a computer (PC), a laptop computer, a tablet, etc. Memory system 8 stores program instructions 17 for monitoring communications, determining vehicle motion, and disabling texting features (and/or voice features) of mobile devices 20a . . . 20b during the detected motion of vehicle 22. Mobile devices 20a . . . 20b may comprise global positioning satellite (GPS) devices, mobile computing devices, smart phones, etc. Computer 14, mobile devices 20a . . . 20c, server system 25, and GPS system 29 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for enabling a communication initiator based distracted driving method).

Vehicle 22 movement detection may include any type of detection movement methods (via usage of external sensors 16a or internal sensors 16b) including, inter alia, global positioning satellite (GPS) tracking/movement detection methods (including triangulation motion detection methods), micro electro-mechanical system (MEMS) methods, Wi-Fi positioning methods, a cellular tower triangulation process, etc. Sensors 16a and sensors 16b may include, inter alia, GPS sensors, motion detector sensors, infrared sensors, temperature sensors, pressure sensors, etc. external sensors 16a or internal sensors 16b MEMS methods (located within cell phones) are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wi-Fi positioning method comprises a localization technique (used for positioning with wireless access points) is based on a process for measuring an intensity of a received signal (i.e., received signal strength in English RSS) and a process comprising finger printing. An accuracy of a Wi-Fi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

System 100 executes a process for enabling a communication initiator based distracted driving prevention method as follows:

A potential communication recipient (e.g., occupant 18a using mobile device 20a) may initiate operation of vehicle 22. In response to detecting the vehicle 22 operation of automobile 22 (i.e., detecting motion), software (e.g., running mobile device 20a) detects that the recipient is driving and a message indicating that the recipient is driving is generated and transmitted to a centralized server (e.g., server system 25) for status (i.e., for the recipient) storage. The recipient's status will be specified as an operational (driving) status until mobile device 20a detects that he/she is no longer operating vehicle 22. Upon detecting that he/she is no longer operating vehicle 22, an updated status is transmitted to the centralized server. If it is detected that mobile device 20a has no service during a status change, the status update will be delivered to the centralized server when mobile device 20a reconnects to the network. The following functions are enabled by system 100 with respect to preventing distracted driving:

1. Data indicating devices and technologies in use by the recipient (e.g., a headset, a text to speech function, etc.) is transmitted to the centralized server.
2. Enabling mobile phone settings indicating that the recipient uses assisted technology may be enabled. For example, speaker phone functions may be enabled to indicate that it is safe to contact the recipient when driving.
3. Correlation of a recipient driving status with a last time that the recipient's device pinged a cellular phone tower to detect if the recipient has potentially lost service (e.g. the recipient is driving vs the recipient was last seen driving 36 minutes ago).
4. Enabling a recipient driving status to be visible to associated contacts, public entities, no contacts, specific inclusion/exclusion contact lists, etc.

The process for distracted driving prevention is initiated when a potential communication initiator enables a communication client and selects a specified recipient. In response, the communication client contacts a central server and performs a lookup process with respect to the recipient. The central server returns a status indicating that the recipient is currently driving. Additionally, the central server may return information with respect to devices/technologies in use by the recipient such as, a headset or other assisted technology as well as information indicating that the data is potentially stale. The status enables the initiator's device to present a driving indicator to the initiator indicating that the recipient is currently driving. The following processes may be executed (by the initiator) in response to the indication that the recipient is currently driving.

1. The initiator may decide to contact the recipient regardless of driving status and transmit an associated text message. For example, the initiator may determine that: the recipient has a hands free device, the initiator has knowledge that the user isn't actually driving, the initiator has an emergency, etc.
2. The initiator may decide not to contact the recipient and close an associated text message window.
3. The initiator may enable a reminder to be triggered when the recipient is determined to be no longer driving. The aforementioned reminder is enabled by a client (of the initiator) transmitting a subscribe message to a server resulting in a subscription to a status of the recipient. In response, the initiator's device receives a push notification when recipient's status indicates no driving functions being executed a resulting reminder (i.e., to contact the recipient) is displayed on the initiator's mobile device. In response, the initiator transmits a message to the recipient.
4. Alternatively, the message may be transmitted to the recipient without displaying the reminder on the initiator's mobile device. Therefore, the initiator may generate a text message and queue the message for delivery on a client application. In response, the client application transmits a subscribe message to a server thereby subscribing to a recipient's status. The initiator's device receives a push notification when recipient's status indicates no driving functions being executed. In response, the queue is instructed to release and transmit the message to the recipient.

Additionally, an initiator may delete or edit messages at any time if the message is still stored in the queue. The initiator may be prompted when a push notification is received to confirm that he/she still wants to transmit a message. Alternatively, an initiator client may enable a prompt to place a phone call to recipient instead of send text message if status indicates recipient is using hands free device. The initiator client may additionally enable an option for automatically dialing a recipient and reading an associated text message if a status indicates that the recipient is using a hands free mobile device.

System 100 enables the following systems/processes for determining if a recipient is currently driving or has stopped driving:

1. A GPS system may be enabled to determine if a mobile device is currently moving over a minimum speed threshold X for a minimum time threshold Y.
2. Traffic data, traffic light data, and/or presence of a road (map data) along with a GPS position may be used to determine that a recipient is currently driving even though he/she has been stopped for over a time threshold Y.
3. Vehicle speakers may be used to determine driver mobile phone usage.
4. An automobile scan tool may be used to determine a specified automotive gear being currently used.
5. Wearable sensors may detect motion. For example, a wrist motion may indicate that the recipient's hands are currently steering the vehicle.
6. A mobile phone built-in motion sensor (or wearable sensor connected to mobile phone) may be used to detect that the recipient has stood up and/or started walking.

Figure 2:
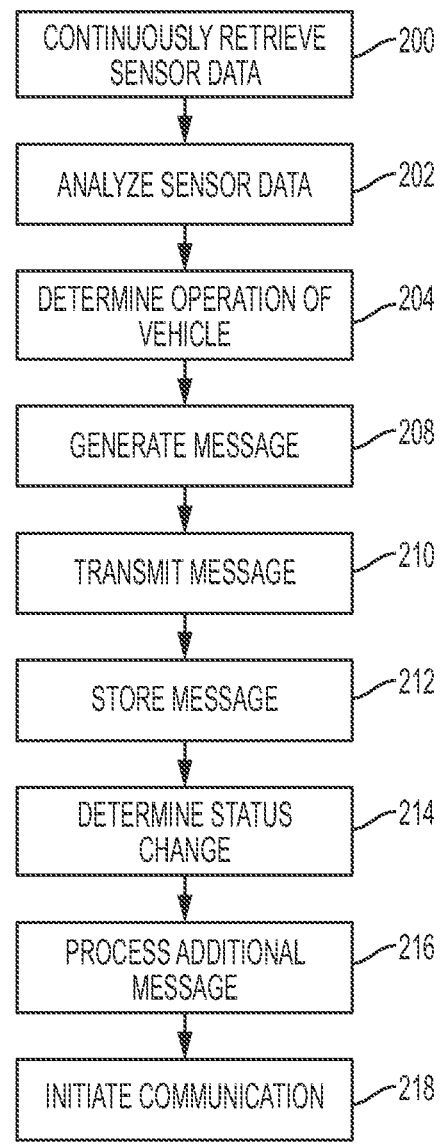
FIG. 2 illustrates a flowchart detailing a process enabled by the system 1of FIG. 1 for indicating vehicle operation, in accordance with embodiments of the present invention.

FIG. 2 illustrates a flowchart detailing a process enabled by system 100 of FIG. 1 for indicating vehicle operation, in accordance with embodiments of the present invention. Each of the steps in the algorithm of FIG. 2 may be enabled and executed in any order by a computer processor executing computer code. In step 200, sensor data is continuously retrieved (by a mobile device) from sensing devices (e.g., a GPS sensor, a motion sensor, an audio sensor, an infrared sensor, a gear detection sensor, etc.). In step 202, the sensor data is analyzed. In step 204, it is determined (based on results of the analysis) that a user (i.e., a recipient) of the mobile device is currently operating a vehicle. In step 208, a message indicating that the user is currently operating the vehicle is generated. In step 210, the message is transmitted to a server and in step 212 the message is stored. In step 214, the sensor data is additionally analyzed and a status change is determined based on the additional analysis. The status change indicates that the user is not currently operating the vehicle. In step 216, an additional message (indicating that the user is not currently operating the vehicle) is generated, transmitted, and stored within the server. In step 218, communications are initiated based on the indication that the user is not currently operating the vehicle.

Figure 3:
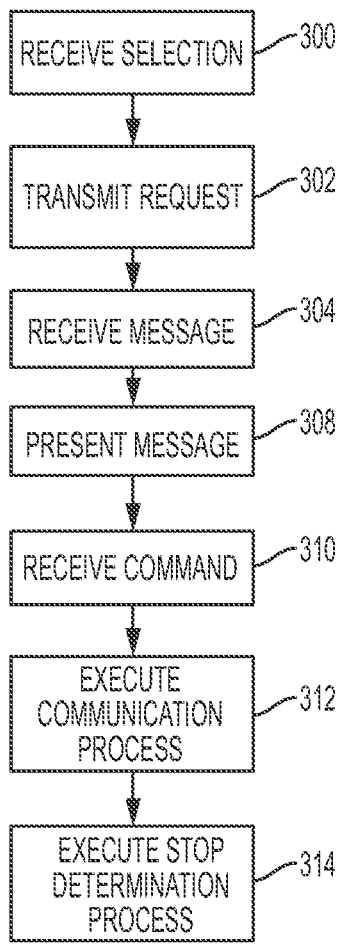
FIG. 3 illustrates a flowchart detailing a process enabled by the system of FIG. 1 for enabling an initiator enabled communication method, in accordance with embodiments of the present invention.

FIG. 3 illustrates a flowchart detailing a process enabled by system 100 of FIG. 1 for enabling an initiator enabled communication method, in accordance with embodiments of the present invention. Each of the steps in the algorithm of FIG. 3 may be enabled and executed in any order by a computer processor executing computer code. In step 300, a selection of a recipient (for communication) is received by a mobile device belonging to an initiating user. In step 302, a request associated with initiating communications (with the recipient) is transmitted to a server via the mobile device. In step 304, a message is received (in response to the request of step 302) from the server. The message indicates that the recipient is currently operating a vehicle. The message may be generated by an additional mobile device belonging to the recipient based on analysis of sensor data retrieved from sensing devices. In step 308, the message is presented to the initiating user via the mobile device. In step 310, a command is received by the mobile device in response to the message. In step 312, a communication process associated with the recipient is executed in response to the command. The communication process may include the following scenarios:
1. Generating communication data (including voice data and text data) and transmitting the communication data to the additional mobile device.
2. Transmitting (and storing in the server) a status change notification request to the server. The status change notification request is associated with generating a notification indicating a recipient status change with respect to the recipient currently operating the vehicle. A status change message associated with the notification is received from the server. The status change message indicates that the user is not currently operating the vehicle. The status change message is presented to the initiating user via the mobile device and the initiator initiates a communication to the recipient based on the notification indicating the recipient status change. The communication may include voice data and text data.
3. Generating communication data (including voice data and text data) and storing the communication data within a queue (located in a server or a mobile device). A status change notification request is transmitted and stored within the server. The status change notification request is associated with generating a notification indicating a recipient status change with respect to the recipient currently operating the vehicle. In response, a status change message associated with the notification is received from the server. The status change message indicates that the user is not currently operating the vehicle. The status change message is presented to the initiating user via the mobile device and in response the communication data is automatically transmitted from the queue to the additional mobile device. Alternatively, the communication data is reviewed (by the initiator) and the communication data is transmitted from the queue (based on a command from the initiator) to the additional mobile device.
4. Determining that the additional mobile device belonging to the recipient is operating in a hands free mode and enabling a telephone call to the additional mobile device belonging to the recipient.
5. Determining that the additional mobile device belonging to the recipient is operating in a hands free mode and transmitting (to the additional mobile device belonging to the recipient) an audio based version of the text data.

In step 314, a stop determination process is executed. The stop determination process includes determining that the recipient has stopped the vehicle for a time period exceeding a predetermined threshold time. In response, traffic pattern data, traffic light based data, and/or mapping data in combination with a GPS position are analyzed and it is determined (based on the analysis) that the recipient is no longer operating the vehicle.

Figure 4:
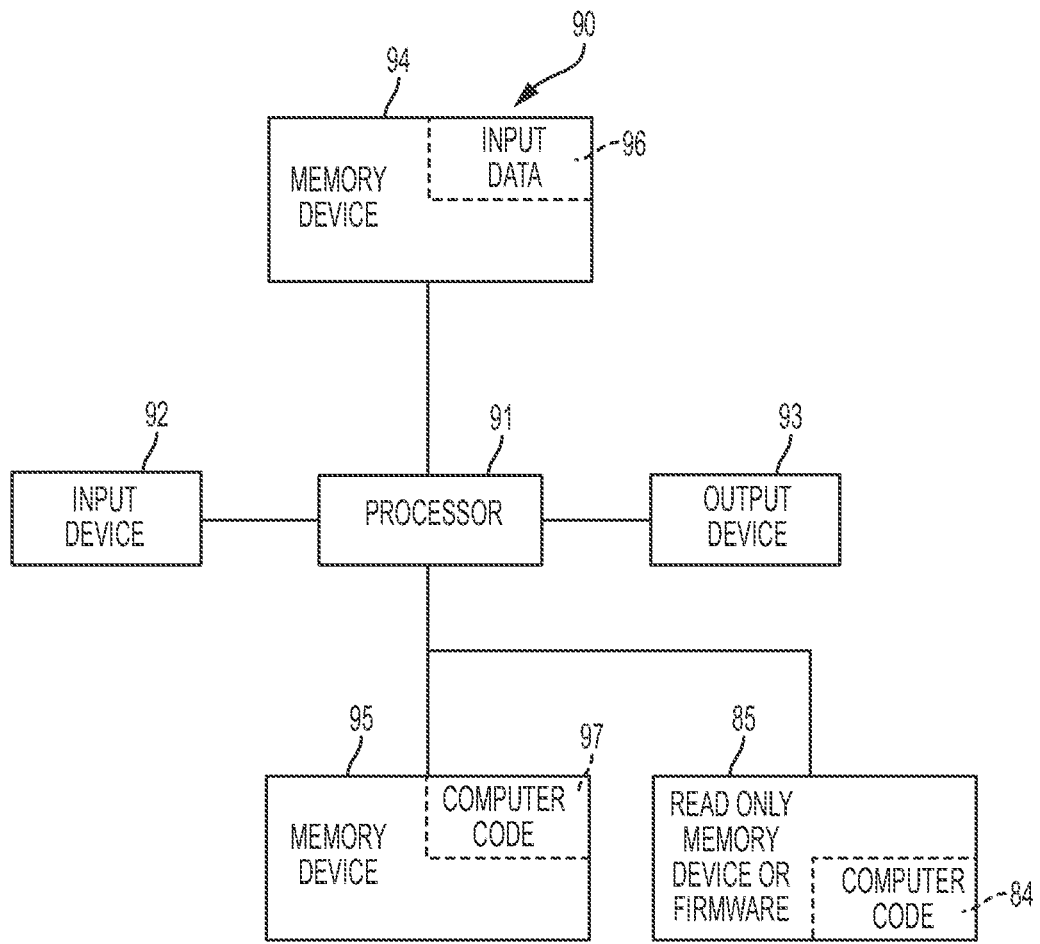
FIG. 4 illustrates a computer system for enabling an initiator based distracted driving prevention method, in accordance with embodiments of the present invention.

FIG. 4 illustrates a computer system 90 (e.g., server system 25, computer 14, and devices 20a . . . 20c of FIG. 1) for enabling an initiator based distracted driving prevention method, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIGS. 2 and 3) for enabling an initiator based distracted driving prevention method. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2 and 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable an initiator based distracted driving prevention method. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling an initiator based distracted driving prevention method. In another embodiment, the invention provides a business method that performs the process steps of the invention on a subscription, advertising, and/or fee basis. That is, a service supplier, such as a Solution Integrator, could offer to enable an initiator based distracted driving prevention method. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A distracted driving prevention method comprising:
analyzing, by a computer processor of a mobile device, sensor data retrieved from a plurality of sensing devices;
periodically requesting, by said computer processor via an accelerometer and a gyroscope of said mobile device, a current location of a user;
first determining, by said processor based on results of comparing each said current location to prior detected locations of said user, a movement type, a direction, and a speed associated with said user within a vehicle;
periodically measuring, by said processor, an intensity of a signal strength of said mobile device with respect to a plurality of wireless access points;
second determining, by said processor based on results of said periodically measuring, multiple positions of said user within said vehicle;
third determining, by said computer processor based on results of said analyzing, said first determining, said second determining, and said third determining, that said user of said mobile device is currently operating said vehicle;
generating, by said computer processor in response to said first determining, said second determining, a message indicating that said user is currently operating said vehicle; and
transmitting, by said computer processor to a server for storage, said message.

2. The method of claim 1, wherein said plurality of sensing devices are located in said vehicle or in said mobile device.

3. The method of claim 1, further comprising:
additionally analyzing, by said computer processor, said sensor data;
additionally determining, by said computer processor based on results of said additionally analyzing, a status change indicating that said user is not currently operating said vehicle;
generating, by said computer processor in response to said additionally determining, an additional message indicating that said user is not currently operating said vehicle;
transmitting, by said computer processor to said server, said additional message; and
storing within said server, by said computer processor, said additional message.

4. The method of claim 1, wherein said message additionally indicates that said user should not be contacted during said operating said vehicle.

5. The method of claim 1, wherein said message additionally indicates that said mobile device comprises driver assisted technology and that said user may be contacted, via said mobile device, during said operating said vehicle.

6. The method of claim 1, wherein said mobile device comprises a device selected from the group consisting of a cellular phone, a headset based cellular phone, and a text to speech based cellular phone.

7. The method of claim 1, further comprising:
transmitting, by said mobile device to said server, communication data indicating each communication and associated time with respect to each cellular phone tower located on a route traveled during said operating said vehicle, wherein said communication data is used to determine disabled communications with respect to said mobile device.

8. The method of claim 1, wherein said plurality of sensing devices comprise a device selected from the group consisting of a GPS sensor, a motion sensor, an audio sensor, an infrared sensor, and a gear detection sensor.

9. The method of claim 1, wherein said message is only visible to specified groups consisting of: contacts of said user, all publicly available contact groups, specified inclusion contact groups, and specified exclusion groups.

10. The method of claim 1, further comprising:
providing at least one support service for at least one of creating, integrating, hosting, maintaining, and deploying computer-readable code in the computing system, said code being executed by the computer processor to implement: said analyzing, said determining, said generating, and said transmitting.

11. A computer program product, comprising a computer readable hardware storage device storing a computer readable program code, said computer readable program code comprising an algorithm that when executed by a computer processor of a mobile device implements a distracted driving prevention method, said method comprising:
analyzing, by said computer processor, sensor data retrieved from a plurality of sensing devices;
periodically requesting, by said computer processor via an accelerometer and a gyroscope of said mobile device, a current location of a user;
first determining, by said processor based on results of comparing each said current location to prior detected locations of said user, a movement type, a direction, and a speed associated with said user within a vehicle;
periodically measuring, by said processor, an intensity of a signal strength of said mobile device with respect to a plurality of wireless access points;
second determining, by said processor based on results of said periodically measuring, multiple positions of said user within said vehicle;
third determining, by said computer processor based on results of said analyzing, said first determining, said second determining, and said third determining, that said user of said mobile device is currently operating said vehicle;
generating, by said computer processor in response to said first determining, said second determining, a message indicating that said user is currently operating said vehicle; and
transmitting, by said computer processor to a server for storage, said message.

12. The computer program product of claim 11, wherein said plurality of sensing devices are located in said vehicle or in said mobile device.

13. The computer program product of claim 11, wherein said method further comprises:
additionally analyzing, by said computer processor, said sensor data;
additionally determining, by said computer processor based on results of said additionally analyzing, a status change indicating that said user is not currently operating said vehicle;
generating, by said computer processor in response to said additionally determining, an additional message indicating that said user is not currently operating said vehicle;
transmitting, by said computer processor to said server, said additional message; and
storing within said server, by said computer processor, said additional message.

14. The computer program product of claim 11, wherein said message additionally indicates that said user should not be contacted during said operating said vehicle.

15. The computer program product of claim 11, wherein said message additionally indicates that said mobile device comprises driver assisted technology and that said user may be contacted, via said mobile device, during said operating said vehicle.

16. The computer program product of claim 11, wherein said mobile device comprises a device selected from the group consisting of a cellular phone, a headset based cellular phone, and a text to speech based cellular phone.

17. The computer program product of claim 11, wherein said method further comprises:
transmitting, by said mobile device to said server, communication data indicating each communication and associated time with respect to each cellular phone tower located on a route traveled during said operating said vehicle, wherein said communication data is used to determine disabled communications with respect to said mobile device.

18. The computer program product of claim 11, wherein said plurality of sensing devices comprise a device selected from the group consisting of a GPS sensor, a motion sensor, an audio sensor, an infrared sensor, and a gear detection sensor.

19. The computer program product of claim 11, wherein said message is only visible to specified groups consisting of: contacts of said user, all publically available contact groups, specified inclusion contact groups, and specified exclusion groups.

20. A mobile device comprising a computer processor coupled to a computer-readable memory unit, said memory unit comprising instructions that when executed by the computer processor implements a distracted driving prevention method comprising:
analyzing, by said computer processor, sensor data retrieved from a plurality of sensing devices;
periodically requesting, by said computer processor via an accelerometer and a gyroscope of said mobile device, a current location of a user;
first determining, by said processor based on results of comparing each said current location to prior detected locations of said user, a movement type, a direction, and a speed associated with said user within a vehicle;
periodically measuring, by said processor, an intensity of a signal strength of said mobile device with respect to a plurality of wireless access points;
second determining, by said processor based on results of said periodically measuring, multiple positions of said user within said vehicle;
third determining, by said computer processor based on results of said analyzing, said first determining, said second determining, and said third determining, that said user of said mobile device is currently operating said vehicle;
generating, by said computer processor in response to said first determining, said second determining, a message indicating that said user is currently operating said vehicle; and
transmitting, by said computer processor to a server for storage, said message.

* * * * *